United States Patent [19]
Christ et al.

[11] Patent Number: 6,120,231
[45] Date of Patent: Sep. 19, 2000

[54] METHOD OF AND APPARATUS FOR EMPTYING CONTAINERS FOR FLOWABLE MATERIALS SUCH AS COMMINUTED TOBACCO LEAVES

[75] Inventors: Horst Udo Christ, Hamburg; Bernd Peitz, Senden, both of Germany

[73] Assignee: Hauni Maschinebau AG, Germany

[21] Appl. No.: 09/326,663

[22] Filed: Jun. 7, 1999

[30] Foreign Application Priority Data

Jun. 6, 1998 [DE] Germany ............................ 198 25 425

[51] Int. Cl.[7] .............................. B65G 65/23; A24C 1/02; A24C 5/39
[52] U.S. Cl. .......................... 414/422; 414/810; 414/403; 414/411; 414/414; 414/419
[58] Field of Search ..................................... 414/403, 404, 414/408, 409, 411, 414, 419, 420, 421, 422, 728, 742, 743, 786, 192, 592, 618, 810

[56] References Cited

U.S. PATENT DOCUMENTS

| | | |
|---|---|---|
| 1,637,800 | 8/1927 | Bronander . |
| 1,970,230 | 8/1934 | Granstedt . |
| 2,401,731 | 6/1946 | Harrison .................................. 414/419 |
| 2,741,797 | 4/1956 | Britton .................................. 414/419 X |
| 3,263,842 | 8/1966 | Holstein .............................. 414/422 X |
| 3,713,554 | 1/1973 | Thompson et al. ................. 414/422 X |
| 4,353,675 | 10/1982 | Risener et al. ....................... 414/419 X |
| 4,657,467 | 4/1987 | Ransohoff et al. ..................... 414/419 |
| 5,123,798 | 6/1992 | Glossman et al. . |

FOREIGN PATENT DOCUMENTS

| | | |
|---|---|---|
| 1 953 622 | 5/1971 | Germany . |
| 41 09 461 | 3/1991 | Germany . |
| 44 10 033 | 9/1995 | Germany . |
| 1050039 | 2/1959 | WIPO ................................... 414/422 |

*Primary Examiner*—Robert P. Olszewski
*Assistant Examiner*—Gerald J. O'Connor
*Attorney, Agent, or Firm*—Venable; George H. Spencer; Robert Kinberg

[57] ABSTRACT

The contents of successive containers for comminuted tobacco leaves are transferred onto or into a receiver (such as a belt conveyor) at a transfer station where an indexible upright manipulator carries a lifter and an evacuating device including a tilting unit. Successive containers, delivered to the transfer station by a roller conveyor or the like, are lifted by the lifter off the conveyor and the manipulator is thereupon indexed to deliver the lifted container to a location above the receiver. The tilting unit is thereupon caused to tilt the container to thus transfer, by gravity flow, the contents of the container onto an openable intercepting device at a level between the tilter and the receiver. The intercepting device is thereupon opened to permit the intercepted material to descend onto or into the receiver. The manipulator is thereupon indexed to move the emptied container to a position above a further conveyor serving to transport empty containers away from the transfer station. The multi-stage transfer of particulate material from a container above the receiver onto or into the receiver reduces the generation of dust and the likelihood of undesirable comminution of such material.

24 Claims, 6 Drawing Sheets

METHOD OF AND APPARATUS FOR EMPTYING CONTAINERS FOR FLOWABLE MATERIALS SUCH AS COMMINUTED TOBACCO LEAVES

CROSS-REFERENCE TO RELATED CASES

This application claims the priority of German patent application Serial No. 198 25 425.3 filed Jun. 6, 1998. The disclosure of the German patent application, as well as that of each US and foreign patent and patent application mentioned in the specification of the present application, is incorporated herein by reference.

BACKGROUND OF THE INVENTION

The invention relates to improvements in methods of and in apparatus for manipulating receptacles which contain a particulate material, such as fragments of tobacco leaves, reconstituted tobacco and/or artificial tobacco. More particularly, the invention relates to improvements in methods of and in apparatus for transferring particulate material from a series of successive receptacles (e.g., cardboard boxes provided with covers or closures in the form of pivotable lids adapted to be moved between operative positions in which they overlie the open tops and inoperative positions in which they afford access to and permit evacuation of the contents of the respective receptacles) into a different receptacle or onto a takeoff or removing conveyor. The means for supplying at least partially filled receptacles to a transfer station can comprise a roller conveyor or another suitable transporting unit.

As a rule, the contents (such as tobacco particles in a cigarette making plant) of receptacles are evacuated by gravity flow. Thus, an oncoming receptacle is lifted off a transporting unit and is transferred to a position at a level above a stationary container, a container on a pallet or another suitable conveyance, or a removing conveyor prior to being turned upside down so that its contents can descend by gravity flow. This invariably entails a contamination of the surrounding atmosphere by minute particles of dust and/or by larger particles, as well as normally undesirable comminution (such as breaking) of shreds or analogous optimal configurations of the conveyed particulate material.

OBJECTS OF THE INVENTION

An object of the invention is to provide a novel and improved method of transferring particulate material from successive at least partially filled receptacles into or onto a receiver (e.g., a belt or chain conveyor, a pallet or a container) in such a way that the generation of dust is less pronounced than by resorting to presently known procedures.

Another object of the invention is to provide a method which is less likely to entail undesirable breakage of the particulate material than the presently known methods.

A further object of the invention is to provide a novel and improved apparatus for the practice of the above outlined method.

An additional object of the invention is to provide a method which can be resorted to for the expulsion of batches of comminued material from a succession of receptacles which are delivered at a high frequency and/or at a variable frequency without affecting the reliability of transfer and/or the quality of the transferred particulate material.

Still another object of the invention is to provide a cigarette making machine which embodies at least one apparatus for the practice of the above outlined method.

A further object of the invention is to provide a novel and improved receptacle manipulating device for use in the above outlined apparatus.

An additional object of the invention is to provide the above outlined improved apparatus with novel means for ensuring that he cover or closure is invariably out of the way when the contents of a receptacle are to be removed by gravity flow.

SUMMARY OF THE INVENTION

One feature of the present invention resides in the provision of a method of transferring particulate material (e.g., a material which includes or constitutes shredded and/or otherwise comminuted tobacco leaves) from successive containers or receptacles (e.g., cardboard boxes and hereinafter referred to as receptacles), which are delivered to a transfer station, onto a receiver (e.g., a belt or chain conveyor, a pallet or an analogous conveyance, or a large box or the like) at the transfer station. The improved method comprises the steps of lifting successive receptacles off the delivering conveyor at the transfer station, moving successive lifted receptacles to a location above the receiver, and evacuating the particulate material from successive receptacles at the aforementioned location in a plurality of successive stages.

The evacuating step can include a first stage of causing particulate material to descend relative to the receptacle at the aforementioned location at least in part by gravity flow, a second stage of intercepting the descending particulate material at a level between the aforementioned location and the receiver, and a third stage of causing the particulate material to descend at least in part by gravity flow from the aforementioned level into or onto the receiver.

The receptacles can constitute boxes or other types of containers having an open top and a closure which is movable relative to the main body of the receptacle between a first position in which the closure overlies the open top and a second position in which the open top of the respective receptacle is exposed. The method of manipulating such receptacles can comprise a further step of moving the closures of successive receptacles to the second positions prior to the evacuating step. The moving step of such method can include indexing successive lifted receptacles about an at least substantially vertical axis, e.g., through an angle of about 90 degrees. Still further, such method can include the additional step of transferring successive emptied receptacles from the aforementioned location onto a removing means (such as an endless belt or chain conveyor); for example, such transferring step can include indexing the emptied receptacles from the aforementioned location (above the receiver) through predetermined angles (e.g., through angles of 90 degrees). Indexing of a manipulator which carries the receptacles from the delivering conveyor to the location above the receiver can be carried out in the same direction as the indexing of emptied containers from the aforementioned location to the removing means.

The evacuating step can include a first stage of tilting the receptacle at the aforementioned location through an angle of about 180° about a substantially horizontal axis.

As already mentioned hereinbefore, the receptacles can be of the type having a top portion or top which is open not later than upon completion of the moving step. In accordance with a presently preferred embodiment of the method, the evacuating step comprises tilting successive receptacles at the aforementioned location about a substantially vertical axis (especially through an angle which is at least close to 180°) so that the open top portions of the thus tilted receptacles can discharge particulate material by gravity flow, intercepting the thus discharged particulate material by at least one intercepting member, which can but need not form part of the means for moving at least partially filled receptacles from the delivering conveyor to the aforementioned location, and which is movable between a first position of at least partial overlap with the top portion of the tilted receptacle at the aforementioned location and a second position in which the intercepted particulate material is free to descend from the at least one intercepting member onto the receiver, and moving the at least one intercepting member from the second position back to the first position.

The moving step can include indexing successive lifted receptacles through approximately 90° about a substantially vertical axis, and the step of removing emptied receptacles from the transfer station can include indexing successive receptacles through additional 90° upon completion of the respective evacuating step to thus transfer successive empty receptacles from the aforementioned location onto the aforementioned removing conveyor.

Another feature of the invention resides in the provision of an apparatus for transferring particulate material from successive at least partially filled open-top receptacles. The improved apparatus comprises a conveyor having means (e.g., rollers) for delivering a series of successive at least partially filled receptacles to a transfer station, a receiver for particulate material at the trasfer station, means for lifting successive receptacles off the conveyor at the transfer station, means for moving successive lifted receptacles to a location above the receiver, and means for evacuating particulate material from successive receptacles at the aforementioned location at least partially under the action of gravity and onto or into the receiver in a plurality of successive stages.

The moving means can comprise means for indexing successive lifted receptacles about a substantially vertical axis, and the lifting means can be supported by the indexing means.

The evacuating means can comprise means for tilting successive moved receptacles at the aforementioned location about a subsantially horizontal axis. The evacuating means can comprise open-and-shut means for intercepting particulate material which is being discharged by the tilted receptacle at the aforementioned location, and means for opening the intercepting means to thus permit gravitational descent of intercepted particulate material from the intercepting mans and onto or into the receiver.

The open-and-shut means of the intercepting means can comprise at least two (e.g., concavo-convex) intercepting members a least one of which is movable relative to another intercepting member between a first position in which the intercepting members can intercept particulate material descending from the receptacle at the aforementioned location, and a second position in which the intercepting members establish a path for gravitational descent of intercepted particulate material onto or into the receiver.

The moving means can comprise an upright manipulator which is indexible about a substantially vertical axis and preferably carries at least one of the evacuating and lifting means. Such apparatus preferably further comprises means for indexing the manipulator about the aforementioned substantially vertical axis through about 90° from a first position in which the lifting means is located above the conveyor for delivery of successive at least partially filled containers to a second position in which the lifting means is disposed above the aforementioned location. Such apparatus can further comprise the aforementioned second conveyor which serves as a means for removing emptied receptacles from the transfer station. The indexing means of such apparatus can be arranged to index the lifting means from the second position at the aforementioned location to a position above the second (removing) conveyor. The arrangement can be such that the second (removing) conveyor can receive empty receptacles from the lifting means in response to indexing of the manipulator through at last 90° beyond the second position.

The receptacles preferably employ or cooperate with closures or covers for their open tops. Such closures (e.g., in the form of flaps which are of one piece with and are pivotable relative to the main portion of a box-shaped receptacle for comminuted tobacco leaves) are or can be movable between first positions in which they overlie the respective open tops, and second positions in which the respective open tops are exposed. The lifting means and/or the evacuating means and/or the indexing means can include means for moving the closures from their first to their second positions during lifting of successive receptacles off the receptacle supplying conveyor.

As already mentioned hereinbefore, the closures can include or constitute pivotable flaps or panels, and the lifting means can further comprise means (in the form of deflectors or the like) for maintaining the flaps in their second positions during movement of receptacles from the receptacle-delivering conveyor to the aforementioned location as well as during evacuation of particulate material at the aforementioned location.

The lifting means can comprise supporting members (e.g., supporting means which can constitute rollers or other types of rotary supporting devices), and means for moving the supporting members beneath the foremost receptacles of the series of such receptacles arriving at the transfer station.

The novel features which are considered as characteristic of the invention are set forth in particular in the appended claims. The improved apparatus itself, however, both as to its construction and the best modes of utilizing the same, together with numerous additional important and advantageous features and attributes thereof, will be best understood upon perusal of the following detailed description of certain presently preferred specific embodimens with reference to the accompanying drawings.

BRIEF DESCRIPTION OF THE DRAWINGS

FIG. 6 is a view similar to that of FIG. 4 or 5 but with the intercepting means at a level between those shown in FIGS.

4 and 5 and with its intercepting members in open or retracted positions.

DESCRIPTION OF PREFERRED EMBODIMENTS

Figure 1:
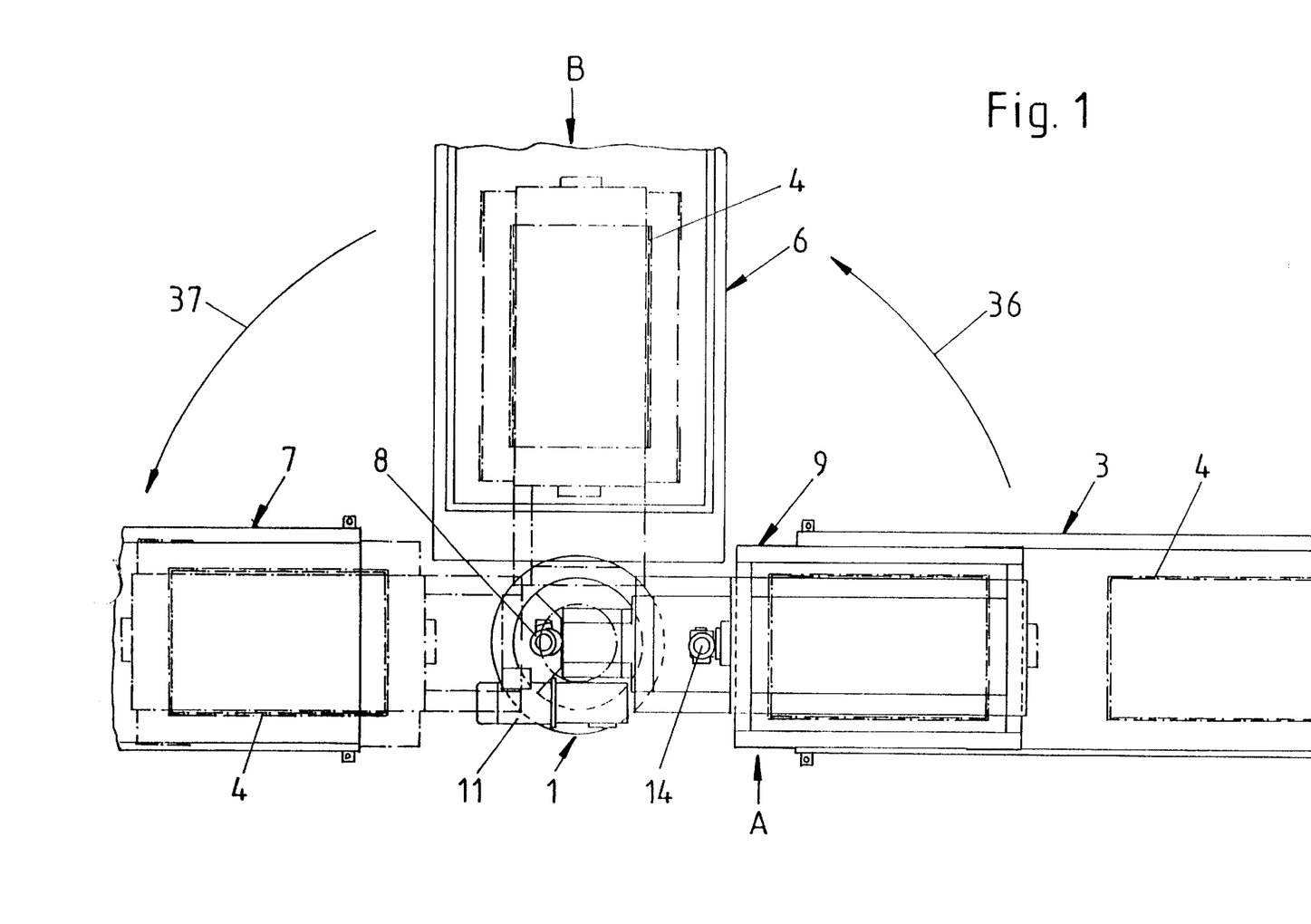
FIG. 1 is a somewhat schematic plan view of an apparatus which embodies one form of the invention.
Figure 2:
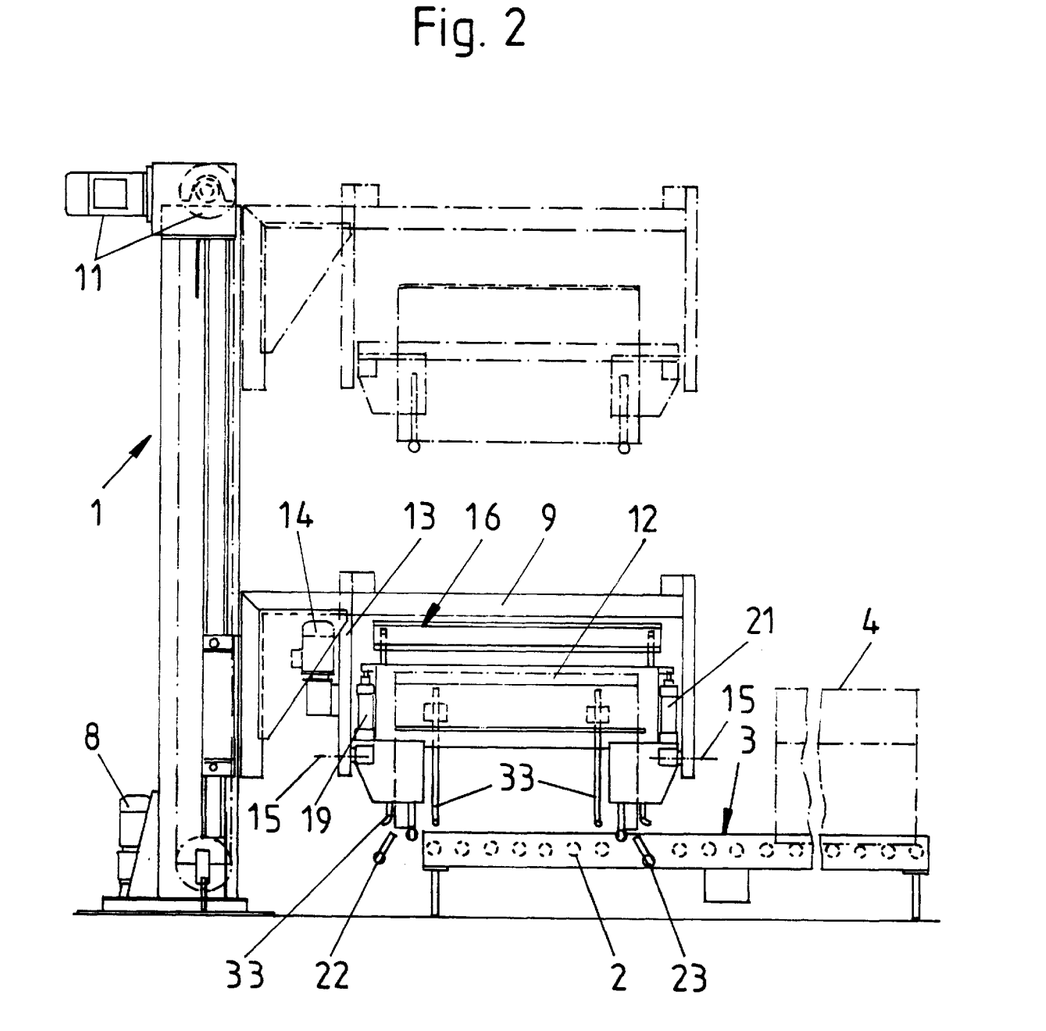
FIG. 2 is a side elevational view of a portion of the apparatus as seen in the direction of arrow A in FIG. 1, the means for lifting successive at least partially filled receptacles off the delivering conveyor being shown in two different positions one of which is indicated by dot-dash lines.

The apparatus which is shown in FIGS. 1 and 2 comprises a first conveyor 3 (hereinafter called delivering conveyor) having rollers 2 which serve to advance a series of successive at least partially filled receptacles 4, e.g., cardboard boxes or cartons having open tops and provided with covers or closures including pairs of lids or panels 34 pivotable between closed or operative positions in which they overlie the respective open tops and second or inoperative positions in which the open tops are exposed and the lids 34 lie flush against the adjacent outer sides of lateral panels of the respective receptacle. The receptacles 4 being delivered by the rollers 2 of the delivering conveyor 3 are assumed to be at least partially filled with a flowable solid particulate material, e.g., by shreds and/or otherwise configurated fragments of tobacco leaves, sheets of reconstituted tobacco or the like.

The conveyor 3 delivers successive foremost filled receptacles 4 to a transfer station shown as being occupied by an upright turret- or column-shaped manipulator 1 which is indexible through angles of 90° in a counterclockwise direction (as viewed in FIG. 1), namely in a direction indicated by the arrows 36 and 37. The manipulator 1 carries a lifter 9 which is movable up and down between a lower end position below the position shown in FIG. 2 by solid lines and an upper end position shown in FIG. 2 by dot-dash lines. The lower end position of the lifter 9 corresponds to that shown in FIG. 4, and the upper end position (corresponding to that shown in FIG. 2 by dot-dash lines) is shown in FIG. 5.

A receiver 6 at the transfer station occupied by the manipulator 1 is positioned in such a way that it can receive the contents of an at least partially filled receptacle 4 subsequent to lifting of such receptacle off the delivering conveyor 3 and following an indexing of the lifted receptacle 4 and lifter 9 through an angle of at least close to 90 degrees (see the arrow 36 in FIG. 1). The receiver 6 can constitute or include an endless belt, band or chain conveyor, a pallet which is reciprocable or otherwise movable (e.g., along suitable tracks) in directions at right angles to the direction of forward movement of successive receptacles 4 along the path defined by the rollers 2 of the conveyor 3, or a relatively large container which is placed next to the manipulator 1 to receive the contents of an at least partially filled receptacle subsequent to indexing of the manipulator 1 and lifter 9 through an angle of at least substantially 90° (refer again to the arrow 36 in FIG. 1).

A further conveyor 7 (hereinafter called removing conveyor) has a receiving end at the transfer station occupied by the manipulator 1 and serves to accept and remove successive empty receptacles 4 delivered by the lifter 9 and reaching the receiving end of the conveyor 7 in response to renewed indexing of the manipulator 1 and lifter 9 through an angle of at least close to 90° (see the arrow 37 in FIG. 1). The means for indexing the manipulator 1 through angles of at least approximately 90° (in the direction indicated by the arrows 36, 37) can comprise a suitable electric, fluid-operated or otherwise designed motor 8 and a suitable transmission between the output element of the motor 8 and the manipulator 1.

The character 12 denotes a carriage which forms part of the lifter 9 and is movable up and down along the manipulator 1 by a suitable elevating unit 11. The latter can move the lifter 9 up and down along an upright frame or column of the manipulator 1 and is designed to share the angular (indexing) movements of the manipulator about a vertical axis.

The carriage 12 is movably mounted in a frame 13 of the lifter 9 and can be tilted about a horizontal axis 15 by a drive 14, preferably back and forth through angles of 180° or thereabout.

Figure 4:
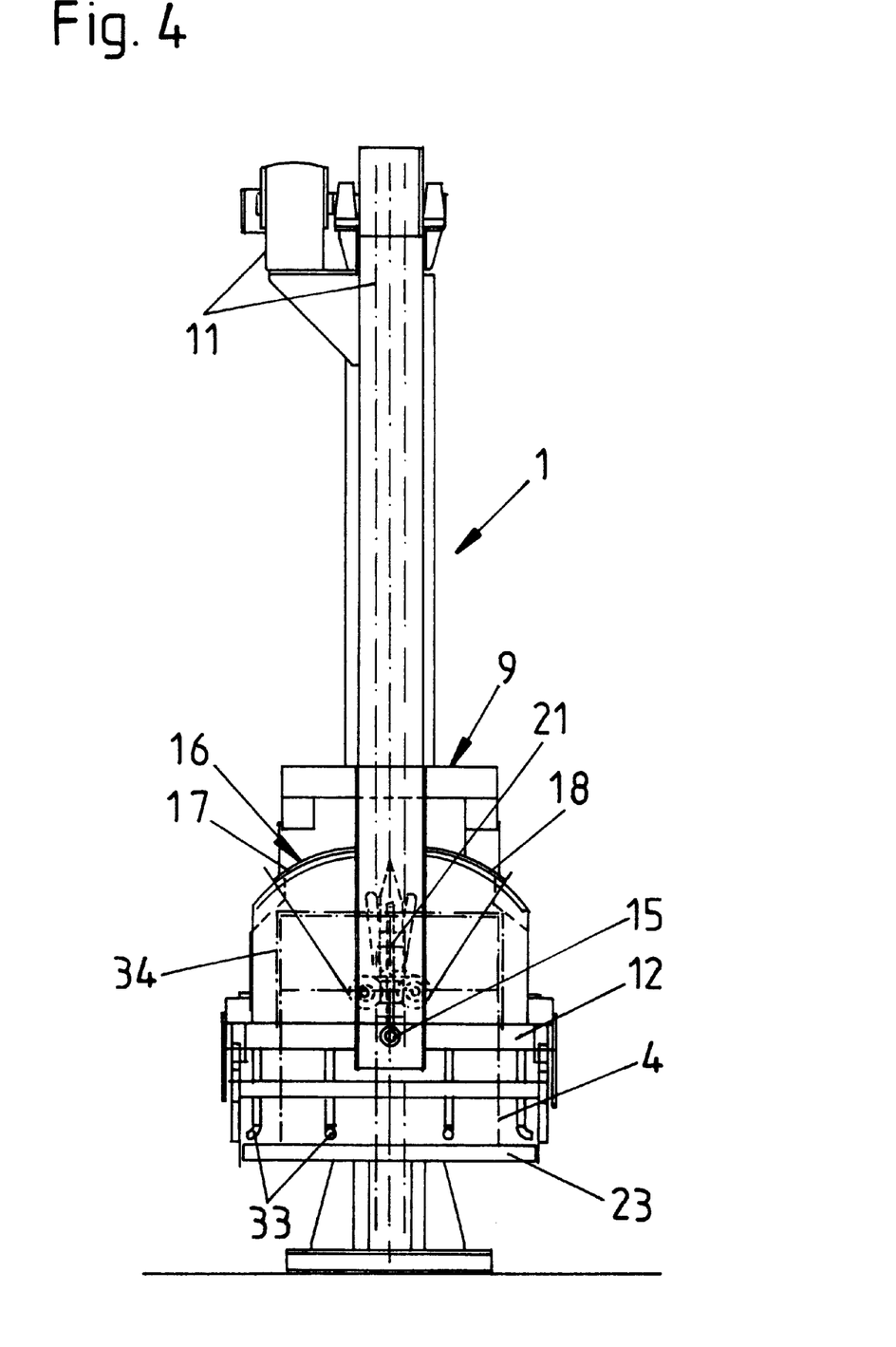
FIG. 4 is an elevational view of the manipulator at the transfer station, as seen in the direction of arrow B in FIG. 1, with the lifting means or lifter in a position corresponding to that shown in FIG. 2 by solid lines.
Figure 5:
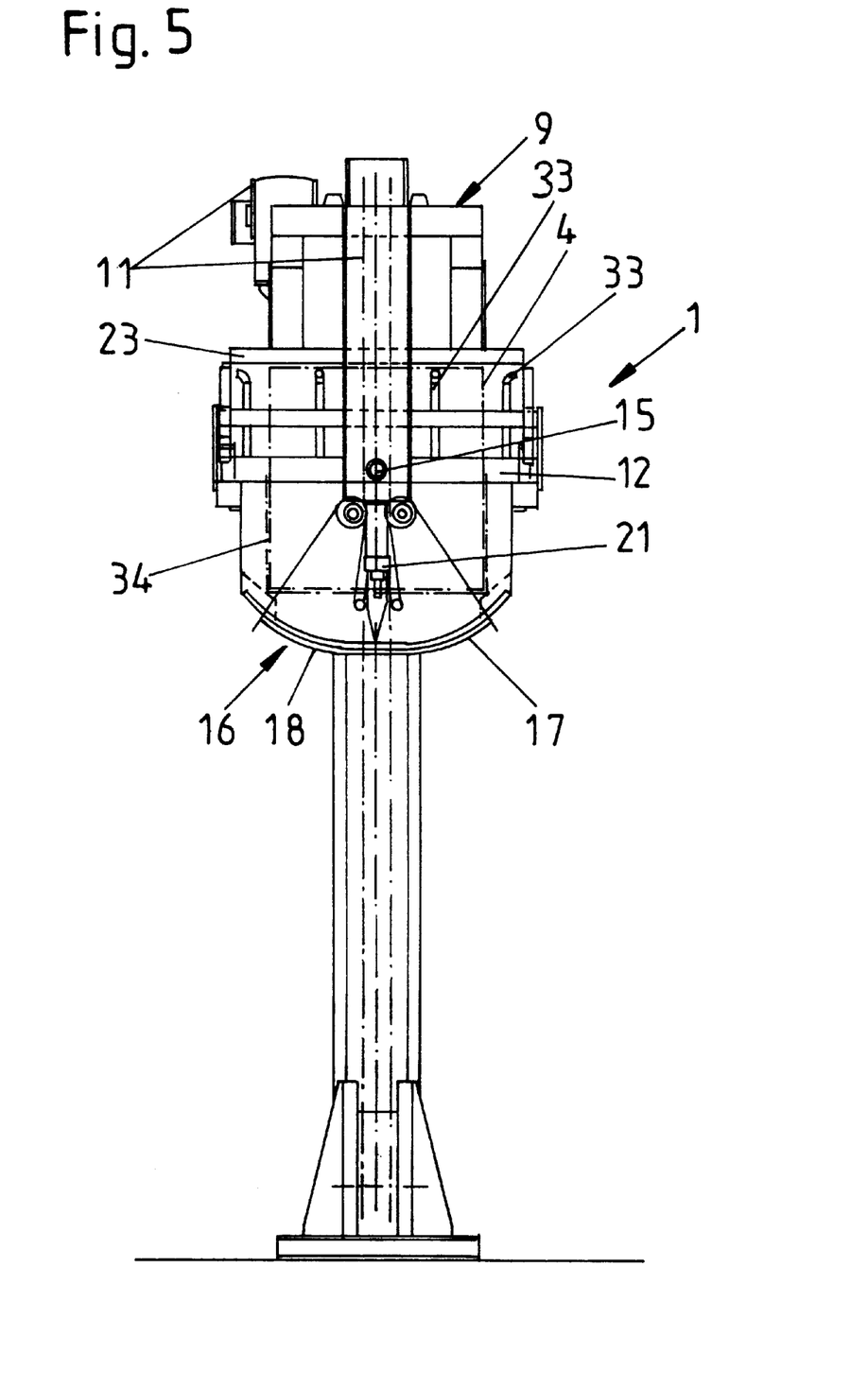
FIG. 5 is a view similar to that shown in FIG. 4 but with the lifting means in a position corresponding to that shown in FIG. 2 by dot-dash lines.
Figure 6:
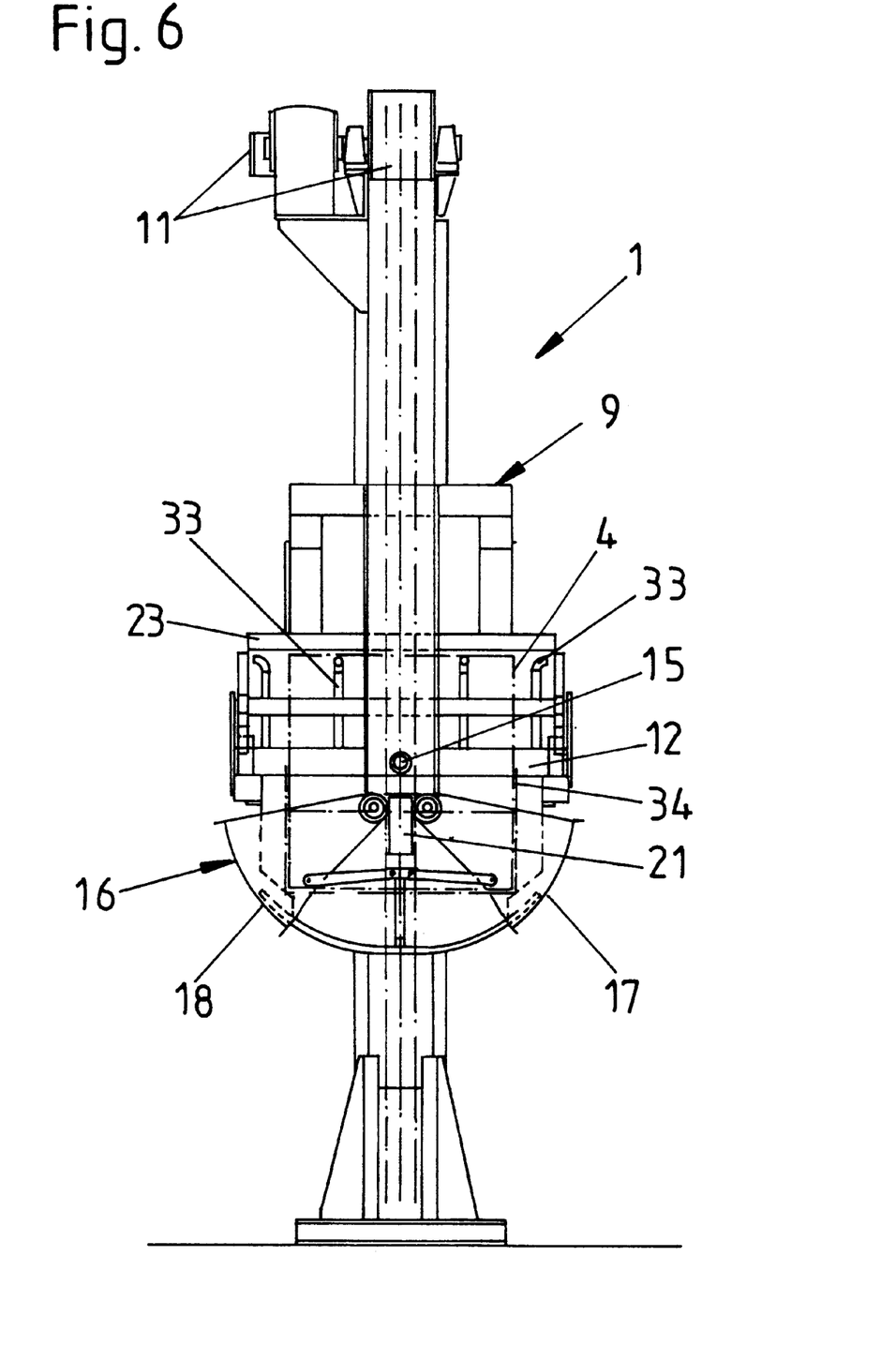

The frame 13 carries an intercepting device 16 including two concavo-convex (shovel shaped) intercepting members 17, 18 tiltable relative to each other about two horizontal axes between first or closed positions (see FIGS. 4 and 5) in which they establish a barrier between a receptacle 4 at a location shown in FIG. 4 (namely above and spaced apart from the receiver 6) and the receiver, and second or open positions (FIG. 6) in which they establish a path for gravitational descent of batches of tobacco particles or other particulate material from a level determined by the location of the intercepting device 16 in FIG. 6 and the receiver 6 therebelow. The means for pivoting the intercepting members 17, 18 relative to each other (or at least one of these intercepting members relative to the other intercepting member) between the positions respectively shown in FIGS. 5 and 6) comprises hydraulic or pneumatic cylinder and piston units 19, 21 arranged to receive signals from a suitable control unit, not shown, which latter is preferably designed to synchronize the movements of various moving parts 1, 11, 14, 19, 21 and 22 in a predetermined sequence. The exact construction of the synchronizing means forms no part of the present inventon.

Figure 3:
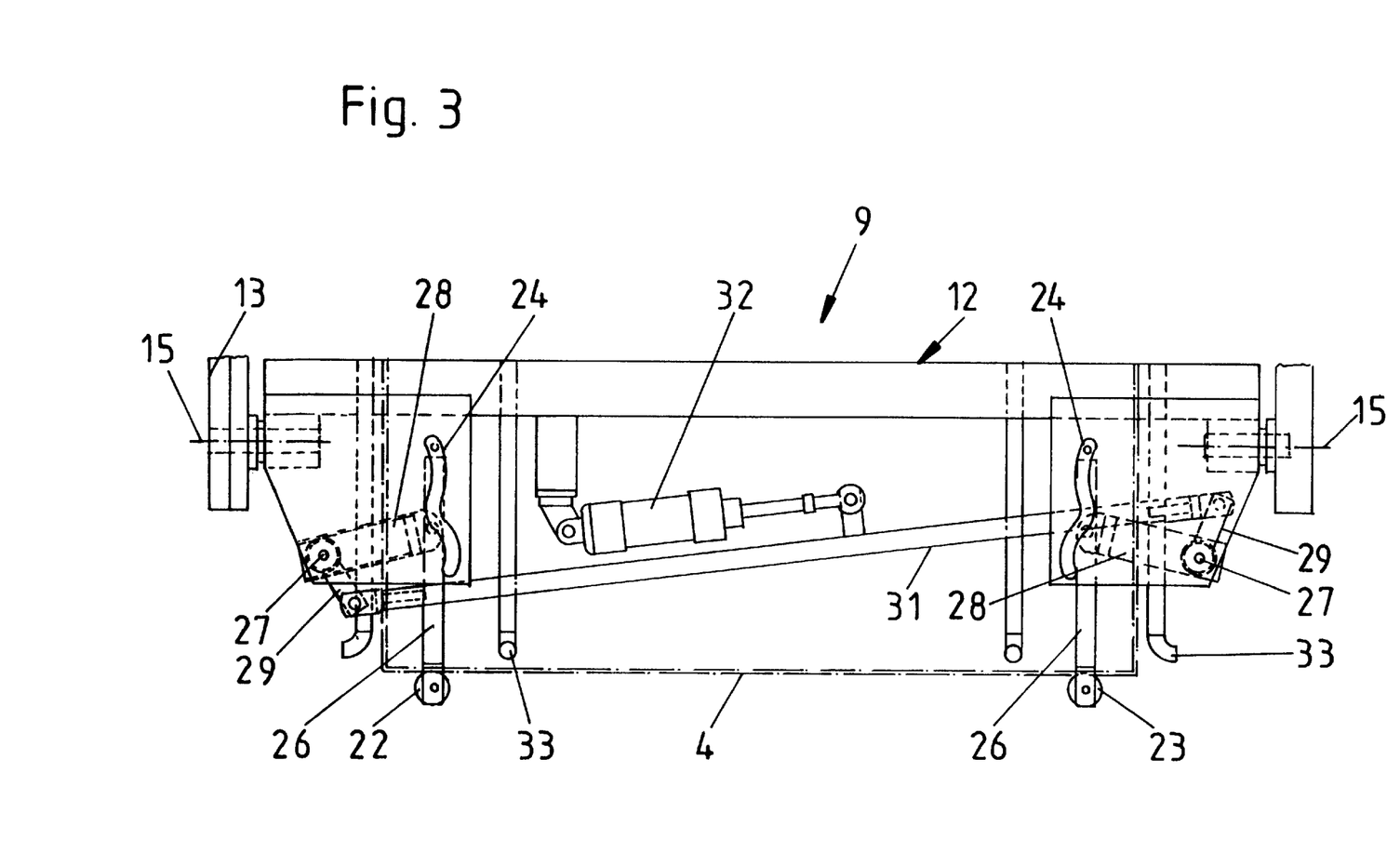
FIG. 3 is an enlarged view of a detail in the apparatus of FIG. 2.

The carriage 12 in the frame 13 of the lifter 9 is equipped with two or more supporting rollers 22, 23 (see FIGS. 2 and 3) which can be caused to engage the foremost receptacle 4 from below and to thereupon lift the properly engaged receptacle off the rollers 2 of the conveyor 3 and on to the level shown in FIG. 5. Such lifting of a receptacle 4 off the conveyor 3 to the level of FIG. 5 takes place prior to indexing of the manipulator 1 (and hence of the lifter 9) about the vertical axis of the manipulator through an angle of at least close to 90° so that the thus lifted and indexed receptacle 4 is then located above the receiver 6.

Each of the roller-shaped supporting members 2, 23, is mounted at the free end of a lever 26 having a follower (not shown) tracking a cam 24. The levers 26 are pivotable relative to the frame 13 about the axes of fixed pivot members 27 and can be caused to engage the foremost receptacle 4 from below prior to upward movement of the frame 13 so that the foremost receptacle and its contents are lifted off the conveyor 3 preparatory to indexing of the lifter 9 to a position or location above the receiver 6 (see FIG. 5). The levers 28 (which carry the supporting rollers or members 22, 23) are attached to a connecting rod 31 (see FIG. 3) receiving motion from a driving unit 32, e.g., a hydraulic or pneumatic cylinder and piston unit. Links 29 connect the levers 29 to the rod 31.

The carriage 12 is further provided with means 33 for moving the lids 34 of the closures or covers between shut and open positions and for maintaining the lids in open positions (in which the tops of the respective receptacles 4 are exposed to afford access to the contents of the receptacles and to permit evacuation of such contents from the respective receptacles by gravity flow). The moving means 33 includes rod-shaped members provided at all four sides of the carriage 12. The members of the moving means 33 are designed to move the lids 34 to their open positions (see FIG. 4) during lowering of the lifter 9 toward the foremost receptacle 4 on the conveyor 3, during subsequent transfer of such receptacle to the location at a level above the receiver 6, and during subsequent manipulation of the receptacle in order to transfer the contents of the receptacle into or onto the receiver 6.

The mode of operation of the improved apparatus is as follows:

The rollers 2 of the delivering conveyor 3 advance a series of successive at least partially filled receptacles 4 toward the transfer station accommodating the upright manipulator 1. When the foremost receptacle 4 approaches the manipulator, the lifter 9 is maintained in or close to the position shown in FIG. 2 by solid lines (such position of the lifter corresponds to that shown in FIG. 4). All that counts is that the lifter 9 be maintained at a level at which it does not interfere with advancement of the foremost receptacle 4 into the range of the supporting rollers 22 and 23. Such rollers are or can be disposed in pairs; for example, a roller 22 and a roller 23 can be disposed at each side of the path which is defined by the rollers 2 of the delivering conveyor 3.

The next step involves a lowering of the lifter 9 by the unit 11, and such downward movement of the lifter is shared by the rod-shaped members of the moving means 33 which is affixed to the carriage 12. These rod-shaped members engage the lids 34 which are maintained in or moved to upright positions (or outwardly beyond upright positions) not later than when the foremost receptacle 4 arrives at the transfer station. The lids 34 are automatically pivoted away from each other and against the outer sides of the respective sidewalls of the receptacle 4 which is located beneath the lifter 9 (see FIG. 4 which shows the lids 34 in their inoperative positions adjacent the respective sidewalls of the receptacle being carried by the lifter). The rod-like members of the moving or pivoting means 33 thereupon continue to hold the lids 34 in the inoperative positions as long as the respective receptacle 4 continues to be carried by the lifter 9.

The downward movement of the lifter 9 is terminated when the supporting rollers 22, 23 are ready to engage the bottom wall of the foremost receptacle 4 from below, and such engagement of the members 22, 23 is effected by the driving unit 32 and the linkages connecting the unit 32 with the rollers 22, 23. Once the rollers 22, 23 engage the underside of the bottom wall of the foremost receptacle 4, the fully exposed top of such receptacle is overlapped by and, if desired, spaced apart from (below) the pivotable members 17, 18 of the intercepting device 16. The illustrated members 17, 18 partially overlap each other above the open top of the receptacle 4 being supported by the lifter 9 so that they can intercept the entire contents of the adjacent at least partially filled receptacle in response to a tilting of the carriage 12, the rollers 22, 23, and the receptacle 4 about the horizontal axis 15 when the transfer of such receptacle to the rollers 2 of the delivering conveyor 3 to the location (FIG. 5) at a level above the receiver 6 is completed. The receptacle 4 reaches such position in response to lifting of the carriage 12 from the level of FIG. 4 (or from a level close to such level) to that of FIG. 5 by the elevator unit 11, and subsequent indexing of the manipulator 1 through 90° (arrow 36) by the motor 8.

The evacuation of the contents of a receptacle 4 which is being held by the rollers 22, 23 includes several stages the first of which can involve a pivoting or tilting of the receptacle 4 about the horizontal axis 15 by the motor 14. Such tilting can take place while the lifter 9 is maintained at the level of FIG. 5 or at an intermediate level (nearer to the receiver 6) shown in FIG. 6. At such time, the intercepting device 16 is closed (i.e., operative) so that the contents of the inverted receptacle are intercepted by the members 17, 18. Prior to tilting, the members 17, 18 can be spaced apart from (i.e., located well above) the top of the material in the receptacle 4 being held by the lifter 9, or the members 17, 18 can be closely or immediately adjacent the material in such receptacle so that the tilting of the receptacle upside down need not involve any appreciable movement of particulate material downwardly and away from the inner side of the bottom wall of the receptacle.

In the next stage of the evacuating step, the member 17 and/or 18 is pivoted relative to the member 18 and/or 17 so that the members 17, 18 establish a path (see FIG. 6) for automatic descent of the intercepted batch of particulate material by gravity flow. The descending particulate material comes to rest in or on the receiver 6, depending upon the nature of the selected receiver.

The manipulator 1 is thereupon indexed (see the arrow 37 in FIG. 1) to deliver the emptied receptacle 4 to a position above the conveyor 7. Such receptacle is released by the lifter 9 (e.g., by turning the carriage 12 through 180° and by thereupon retracting the supporting rollers 22, 23) so that it can descend onto the conveyor 7 for the transport to a refilling, discarding (e.g., recycling) or other station, not shown. The manipulator 1 is then ready for indexing to the position in which the lifter is held at a level above the foremost at least partially filled receptacle 4 on the rollers 2 of the conveyor 3. Such indexing of the manipulator 1 can involve a single-stage or two-stage indexing of the manipulator in a counterclockwise direction, as viewed in FIG. 1, or a single-stage or two stage indexing in a clockwise direction, always through angles of 90°.

The operation of the improved apparatus can be automated to a desired exent. Furthermore, the level at which the intercepting unit 16 is caused to release a batch of solid particulate material above the receiver 6 can be selected or altered as a function of one or more parameters such as the brittleness of the particulate material, the distance of the lifter 9 from the receiver 6 at the time the intercepting members 17, 18 are caused to establish a path for gravitational descent of the batch of particulate material, the percentage of dust in the batches of particulate material, and/or others.

Furthermore, the intercepting means need not be mounted on the lifter 9, i.e., such intercepting means (or an equivalent intercepting means) can be installed on a stationary support (not shown) at a level above the receiver 6 but below the path of movement of the lifter 9 from the position of alignment with the conveyor 3 to the position of alignment with the receiver 6. Moreover, the tilting stage of the evacuating step can begin while the lifter 9 is held in a position at a maximum distance from the level of the receiver 6, while the lifter 9 descends from the level of FIG. 5 to the level of FIG. 6, or after the lifter 9 reaches the level shown in FIG. 6. This can depend upon the dust content of the particulate material which is being confined in the receptacles 4 on the conveyor 3, on the brittleness (moisture content) of the particulate material, and/or upon other variables.

An important advantage of the improved method and apparatus is that the percentage of dust escaping into the atmosphere surrounding the manipulator 1 can be reduced to a fraction of dust generation by conventional apparatus. The same holds true as regards the extent of comminution of particulate material during and subsequent to inversion of filled or at least partially filled receptacles 4 (i.e., during transfer of the contents of a lifted receptacle onto the intercepting unit 16 beneath the open top of such (inverted) receptacle and/or during dumping of intercepted batches of particulate material into or onto the receiver 6.

Another advantage of the improved apparatus is its compactness. Thus, by mounting the lifter 9 on the upright manipulator 1, one can achieve substantial savings in space. The same holds true for the distribution of the conveyors 3, 7 and receiver 6 at the transfer station, i.e., around the manipulator 1.

The provision of the moving or pivoting means 33 constitutes an optional but highly desirable feature of the improved apparatus. Such moving or pivoting means can be omitted if the receptacles 4 are not provided with covers or closures, such as the covers including the panels or lids 34.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of manipulating accumulations of comminuted tobacco leaves or the like and, therefore, such adaptations should and are intended to be comprehended within the meaning and range of equivalence of the appended claims.

What is claimed is:

1. A method of transferring particulate material from successive receptacles of a series of receptacles, which are supplied to a transfer station by a delivering conveyor, onto a receiver located at said transfer station, comprising the steps of lifting successive receptacles off the delivering conveyor;

moving successive lifted receptacles to a location above the receiver; and evacuating the particulate material from successive receptacles at said location onto the receiver in a plurality of successive stages.

2. The method of claim 1, wherein said evacuating step includes a first stage of causing particulate material to descend relative to the receptacle at said location at least in part by gravity flow, a second stage of intercepting the descending particulate material at a level between said location and said receiver, and a third stage of causing the particulate material to descend at least in part by gravity flow from said level onto said receiver.

3. The method of claim 2, wherein said first stage includes tilting the receptacle at said location.

4. The method of claim 1, wherein the particulate material includes tobacco.

5. The method of claim 1 of transferring particulate material from successive receptacles of the type having an open top and a closure movable between a first position in which the closure overlies the open top and a second position in which the open top is exposed, further comprising the step of moving the closures of successive receptacles to the second positions prior to said evacuating step.

6. The method of claim 5, wherein said moving step includes indexing successive lifted receptacles about an at least substantially vertical axis through an angle of about 90 degrees.

7. The method of claim 6, further comprising the step of transferring successive emptied receptacles from said location onto a removing conveyor, including indexing the emptied receptacles from said location through angles of about 90 degrees.

8. The method of claim 1, further comprising the step of delivering successive emptied receptacles from said location onto a removing conveyor.

9. The method of claim 1, wherein said evacuating step incudes a first stage of tilting the receptacle at said location through an angle of about 180° about a horizontal axis.

10. The method of claim 1 of transferring particulate material from successive receptacles of the type having a top portion which is open not later than upon completion of said moving step, wherein said evacuating step comprises tilting successive receptacles at said location about a substantially horizontal axis through an angle of approximately 180° so that the open top portions of the thus tilted receptacles can discharge particulate material by gravity flow, intercepting the thus discharged particulate material by at least one intercepting member which is movable between a first position of overlap with the top portion of the tilted receptacle at said location and a second position in which the intercepted particulate material is free to descend from the at least one intercepting member onto said receiver, and moving the at least one intercepting member from the second position back to the first position.

11. The method of claim 1, wherein said moving step includes indexing successive lifted receptacles through about 90° about a substantially vertical axis, and further comprising the step of indexing successive receptacles through additional 90° upon completion of the respective evacuating step to thus transfer successive empty receptacles from said location onto a second conveyor.

12. Apparatus for transferring particulate material from successive at least partially filled open-top receptacles, comprising a conveyor having means for delivering a series of successive at least partially filled receptacles to a transfer station;

a receiver for particulate material at said transfer station;

means for lifting successive receptacles off said conveyor at said transfer station;

means for moving successive lifted receptacles to a location above said receiver; and means for evacuating particulate material from successive receptacles at said location, at least partially under the action of gravity, and onto said receiver in a plurality of successive stages.

13. The apparatus of claim 12, wherein said moving means comprises means for indexing successive lifted receptacles about a substantially vertical axis.

14. The apparatus of claim 13, wherein said lifting means is supported by said indexing means.

15. The apparatus of claim 12, wherein said evacuating means comprises means for tilting successive moved receptacles about a substantially horizontal axis.

16. The apparatus of claim 15, wherein said evacuating means further comprises open-and-shut means for intercepting particulate material which is being discharged by the tilted receptacle at said location, and means for opening said intercepting means to thus allow for gravitational descent of intercepted particulate material from said intercepting means onto said receiver.

17. The apparatus of claim 16, wherein sad open-and-shut means of said intercepting means comprises at least two intercepting members at least one of which is movable relative to another intercepting member between a first position in which said intercepting members can intercept particulate material descending from the receptacle at said location and a second position in which the intercepting members establish a path for gravitational descent of intercepted particulate material onto said receiver.

18. The apparatus of claim 12, wherein said moving means comprises an upright manipulator which is indexible about a substantially vertical axis and carries said evacuating means and said lifting means.

19. The apparatus of claim 18, further comprising means for indexing said manipulator about said substantially vertical axis through about 90° from a first position in which said lifting means is located above said conveyor to a second position in which said lifting means is disposed above said location.

20. The apparatus of claim 19, further comprising a second conveyor for removing emptied receptacles from said transfer station, said indexing means being arranged to index said lifting means from said second position at said location to a position above said second conveyor.

21. The apparatus of claim 20, wherein said second conveyor can receive empty receptacles from said lifting means in response to indexing of said manipulator through at least 90°0 beyond said second position.

22. The apparatus of claim 12 for transferring particulate material from receptacles having closures for the open tops thereof, said closures being movable between first positions in which they overlie the respective open tops and second positions in which the respective open tops are exposed, said lifting means including means for moving the closures from first to second positions during lifting of successive receptacles off said conveyor.

23. The apparatus of claim 22, wherein said closures are pivotable flaps and said lifting means further comprises means for maintaining said flaps in said second positions during movement of recepacles from said conveyor to said location and during evacuation of particulate material at said location.

24. The apparatus of claim 12, wherein said lifting means comprises rotary supporting members for the receptacles and means for moving said supporting members beneath the foremost receptacles of said series.

* * * * *

UNITED STATES PATENT AND TRADEMARK OFFICE
CERTIFICATE OF CORRECTION

PATENT NO : 6,120,231
DATED : September 19, 2000
INVENTOR(S) : CHRIST et al.

It is certified that error appears in the above-identified patent and that said Letters Patent are hereby corrected as shown below:

On the title page, change line [73] to read --Hauni Maschinenbau AG, Germany--

Signed and Sealed this

First Day of May, 2001

Attest:

NICHOLAS P. GODICI

Attesting Officer

Acting Director of the United States Patent and Trademark Office